United States Patent [19]

McCann

[11] Patent Number: 5,691,591
[45] Date of Patent: Nov. 25, 1997

[54] SWITCHED RELUCTANCE MOTOR WITH INDIRECT POSITION SENSING AND MAGNETIC BRAKE

[75] Inventor: Roy A. McCann, Kettering, Ohio

[73] Assignee: ITT Automotive Electrical Systems Inc., Auburn Hills, Mich.

[21] Appl. No.: 445,444

[22] Filed: May 19, 1995

[51] Int. Cl.$^6$ .................. H02K 1/00; H02K 3/00
[52] U.S. Cl. .......... 310/198; 310/180; 310/184; 318/701; 318/696; 318/254
[58] Field of Search .................. 310/198, 180, 310/184; 318/701, 696, 254

[56] References Cited

U.S. PATENT DOCUMENTS

| | | | |
|---|---|---|---|
| 3,774,062 | 11/1973 | Johnson | 310/184 |
| 3,887,854 | 6/1975 | Parks | 318/224 |
| 4,100,473 | 7/1978 | Lawrenson | 318/696 |
| 4,296,244 | 10/1981 | Rabe | 310/184 |
| 4,520,300 | 5/1985 | Fradella | 318/603 |
| 4,808,868 | 2/1989 | Roberts | 310/68 R |
| 5,111,095 | 5/1992 | Hendershot | 310/168 |
| 5,166,568 | 11/1992 | Nystuen et al. | 310/254 |
| 5,291,115 | 3/1994 | Ehsani | 318/701 |

FOREIGN PATENT DOCUMENTS

| | | |
|---|---|---|
| 0446058A2 | 9/1991 | European Pat. Off. . |
| 446 058 A2 | 3/1991 | Germany . |

OTHER PUBLICATIONS

"A Doubly Salient Doubly Excited Variable Reluctance Motor", Department of Electrical and Computer Enginering, University of of Wisconsin–Madison—Authors: Hsien-Yuan Li, Feng Liang, Yifan Zhao and Thomas A. Lipo, Published 1993 @ IAS Conference (IEEE).
PCT Search Report Dated Jul. 5, 1996 for Application No. PCT/US96/06605.
8049b IEE Proceedings—B 137 (1990) Jul. No. 4, Part B, Stevenage, Herts., GB.
Implicit Rotor Position Sensing Using Search Colis for a Self–Commutating Permanent Magnet Drive, IEE Proceedings, Vo. 137, Pt. B, No. 4, Jul. 1990.
A Sliding Mode Observer Based Controller for Switch Reluctance Motor Drives.
New Modulation Encoding Techniques for Indirect Rotor Position Sensing in Switched Reluctance Motors.
Elimination of Discrete Position Sensor and Current Sensor in Switched Reluctance Motor Drives.
Dual–Decay Converter for Switched Reluctance Motor Drives in Low–Voltage Applications.
Rotor Position Sensing in Switched Reluctance Motor Drive by Measuring Mutually Induced Voltages.

*Primary Examiner*—Steven L. Stephan
*Assistant Examiner*—Elvin G. Enad
*Attorney, Agent, or Firm*—J. Gordon Lewis; Thomas N. Twomey

[57] ABSTRACT

A switched reluctance motor includes an auxiliary winding interspersed among the main phase windings such that a constant inductance ratio is established between the main and auxiliary windings regardless of rotor position. The auxiliary winding preferably has a higher inductance compared to the main winding. A test current is injected into the auxiliary winding in order to indirectly determine rotor position and the auxiliary winding is utilized to maintain a holding torque under static load conditions. The disclosed design and methodology improves motor function capabilities and economies.

15 Claims, 2 Drawing Sheets

SWITCHED RELUCTANCE MOTOR WITH INDIRECT POSITION SENSING AND MAGNETIC BRAKE

BACKGROUND OF THE INVENTION

1. Field of the Invention

This invention relates to switched reluctance motors and, more specifically, to a switched reluctance motor that has an indirect rotor position sensor and a magnetic brake feature.

2. Description of the Prior Art

Switched reluctance motors are used in a variety of applications. One such application includes an automobile hydraulic control system. Such systems are typically controlled by, for example, a piston that is driven by a motor through a rotary-to-linear converter. One example of such a mechanism is a ball nut and lead screw mechanism. Switched reluctance motors are useful in such applications because they can operate over a wide speed range. Switched reluctance motors are also useful because they operate from a low voltage source, typically found in automobile systems. Further, switch reluctance motors have a high torque-to-inertia ratio compared to conventional dc motors, which provides for fast system response time.

The use of conventional switched reluctance motors in such applications has several limitations and includes several shortcomings and drawbacks. In order to operate at high speed from a low voltage source, a switched reluctance motor necessarily include conductive coil windings with relatively few turns of wire about each stator pole. The inclusion of a low number of turns results in large steady state holding currents under conditions where the motor must maintain a high system pressure. In order to accommodate such high holding currents, the motor drive electronics must include a large heat sinking capacity. This introduces undesirable additional hardware and expense. For example, a forced liquid or air cooling system must be included in order to compensate for the large steady state holding current that is required.

Another disadvantage associated with conventional switched reluctance motors is that a separate mechanical brake or clutch mechanism is utilized to lock the motor shaft in a particular position when the motor must maintain a high system pressure. Although the inclusion of such a mechanical brake mechanism reduces the electronic thermal dissipation requirements, it introduces additional hardware into the system, which reduces ease of assembly, conservation of space and other efficiencies.

Switched reluctance motors are electronically commutated, therefore, some means of rotor position sensing must be provided. Prior attempts at determining rotor position include direct position sensing devices such as optical encoders or resolvers that measure rotor position. Such devices are often undesirable because they introduce additional hardware into the system and, therefore, additional cost. Several attempts at using an indirect rotor position sensing methodology include using a non-torque producing main phase winding to generate a position signal. A major disadvantage associated with such prior indirect sensing methods includes the necessary use of a relatively small test current to generate a rotor position signal. Since the non-torque producing stator pole is not electrically isolated from the remainder of the system, there is an inherent possibility for interference from electrical noise. Since the test current used is necessarily small, the noise-to-signal ratio can be undesirably small. In other words, such indirect sensing methods include an undesirably high possibility for the introduction of error into the rotor position determination.

Therefore, this invention provides a switched reluctance motor and methodology that overcome the drawbacks discussed above. A switched reluctance motor designed in accordance with this invention and utilized in connection with the inventive methodology provides many significant advantages.

SUMMARY OF THE INVENTION

In general terms, a switched reluctance motor designed in accordance with this invention includes a rotor that rotates about an axis and has a plurality of rotor poles. A stator that is stationary about the rotor axis generally surrounds the rotor. The stator also includes a plurality of poles and the rotor poles move into and out of alignment with the stator poles when the rotor rotates about its axis. A main current conducting coil that has a first inductance is disposed about at least one of the stator poles. An auxiliary current conductive coil is disposed about the same stator pole such that an inductance ratio of the main coil to the auxiliary coil is constant irrespective of a position of the rotor poles relative to the stator poles. The auxiliary coil has a second inductance that is greater than the inductance of the main coil.

A selectively controllable current source individually energizes the main coil and the auxiliary coil, respectively, to thereby produce a magnetic flux that controls whether the rotor rotates about its axis, relative to the stator. A voltage sensor determines a voltage across the auxiliary coil when the auxiliary coil is energized by the current source. Means for determining a difference in a current phase value, which is associated with a current in the auxiliary coil, and a voltage phase value, which is associated with the voltage across the auxiliary coil, provides a signal that is indicative of the position of the rotor poles relative to the stator poles.

The methodology associated with this invention for controlling a switched reluctance motor includes four basic steps. First, a main coil, which is disposed about a stator pole, is energized such that a motion inducing current is established in the main coil. The current in the main coil causes a rotor to rotate relative to the stator pole. Second, it is determined whether the rotor has reached a preselected rotation condition. Next, an auxiliary coil, which is disposed about the same stator pole such that a constant inductance ratio of the main coil to the auxiliary coil is established, is energized such that a current is established in the auxiliary coil. The current in the auxiliary coil maintains the rotor in the preselected rotation condition. Lastly, the main coil is deenergized once the auxiliary coil is energized sufficient to maintain the rotor in the preselected rotation condition.

A switched reluctance motor designed in accordance with this invention and used to implement the methodology associated with this invention provides significant advantages over the prior art. This invention provides more accurate indirect rotor position sensing; provides a magnetic locking feature that reduces motor current under large static conditions; improves the thermal performance of a motor; provides quieter motor operation; improves motor time response to large static loading; improves motor system reliability; and provides smaller overall volume of the motor system.

These and other features and advantages of this invention will become apparent to those skilled in the art from the following detailed description of the preferred embodiments and accompanying drawings.

DETAILED DESCRIPTION OF THE PREFERRED EMBODIMENTS

Figure 1:
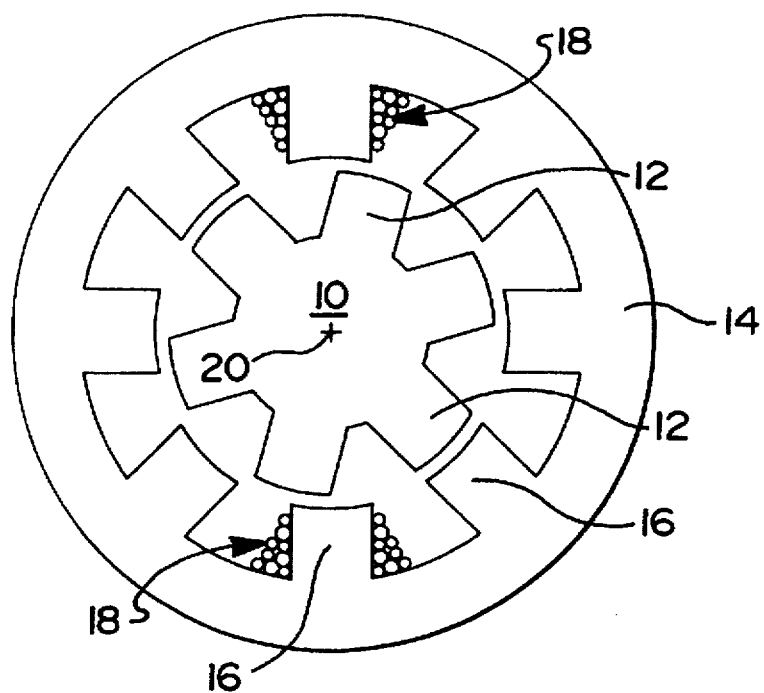
FIG. 1 is a cross-sectional view of selected portions of a switched reluctance motor designed in accordance with this invention.

FIG. 1 illustrates, in cross-sectional view, a rotor 10 that has a plurality of rotor poles 12. Stator 14, which has a plurality of stator poles 16, is stationary and generally surrounds rotor 10. Coil windings 18 are wound about one opposing pair of stator poles 16. Although only one pair or phase of windings 18 is specifically illustrated, it will be appreciated by one skilled in the art that each stator pole 16 would have a winding disposed about it.

When the windings 18 are energized, a current is established and a magnetomotive force is created that causes rotor 10 to rotate about rotor axis 20. Rotor 10 rotates about rotor axis 20 because the magnetomotive force urges a pair of opposing rotor poles 12 into alignment with a pair of opposing stator poles 16. A series of phases or windings, are electrically commutated such that rotor 10 rotates about rotor axis 20 in a conventional manner.

Figure 2:
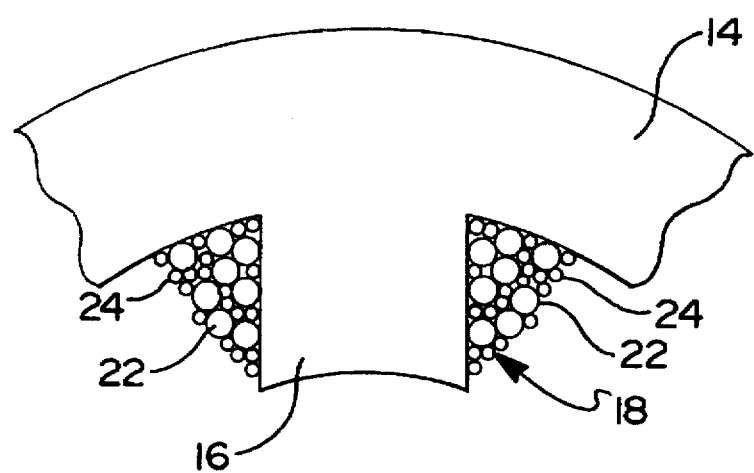
FIG. 2 is close-up view of a portion of the illustration of FIG. 1.

FIG. 2 illustrates, in more detail, the nature of windings 18, designed in accordance with this invention. A main coil 22 is comprised of a number of windings about stator pole 16. Auxiliary coil windings 24 are interspersed among and between the main coil windings 22. As can been seen from the illustration, there are a larger number of auxiliary coil windings 24 compared to the number of main coil windings 22. Also, it is preferred that the diameter of the auxiliary coil windings 24 is smaller than the diameter of the main coil windings 22. It is possible to vary the number of coil windings and/or the sizes of the main and auxiliary coil windings provided that the auxiliary coil has a higher inductance and a constant inductance ratio between the main coil and the auxiliary coil is maintained, regardless of the position of the rotor relative to the stator poles. Main coil windings 22 are used to generate the electromotive force that causes rotor 10 to rotate about rotor axis 20 as will be described in more detail below. Auxiliary coil windings 24 are used to indirectly determine the position of rotor poles 12 relative to stator poles 16 and to maintain motor torque under hydrostatic load conditions as will be described in more detail below.

Figure 3:
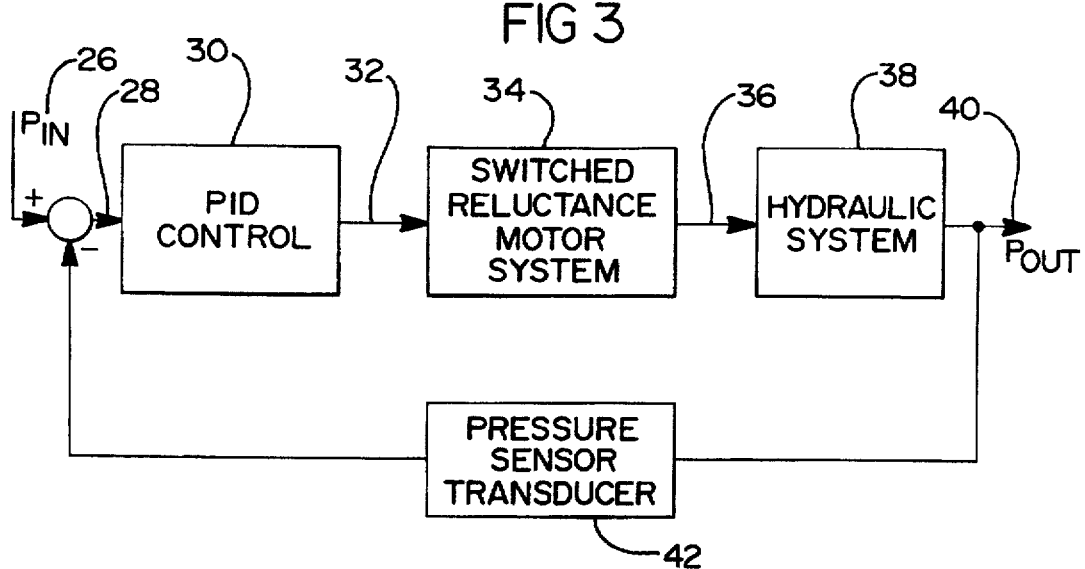
FIG. 3 is a block diagram illustration of how the switched reluctance motor designed in accordance with this invention can be applied in an automotive system.

FIG. 3 illustrates, in block diagram form, how a switched reluctance motor system designed in accordance with this invention can be employed in an automotive hydraulic system application. Pressure input signal 26 is provided by an appropriate control module, such as an electronic controller, which is a step input that corresponds to a maximum system pressure value. Error signal 28 is processed by PID controller 30 in order to produce a motor control signal at 32. Motor control signal ($V_{in}$) is processed by switched reluctance motor system 34 such that an appropriate motor torque is generated (at 36) to appropriately drive hydraulic system 38. Hydraulic system 38 produces an output pressure 40, which is also processed by pressure sensor transducer 42 in a feedback loop that provides for more accurate pressure control.

Figure 4:
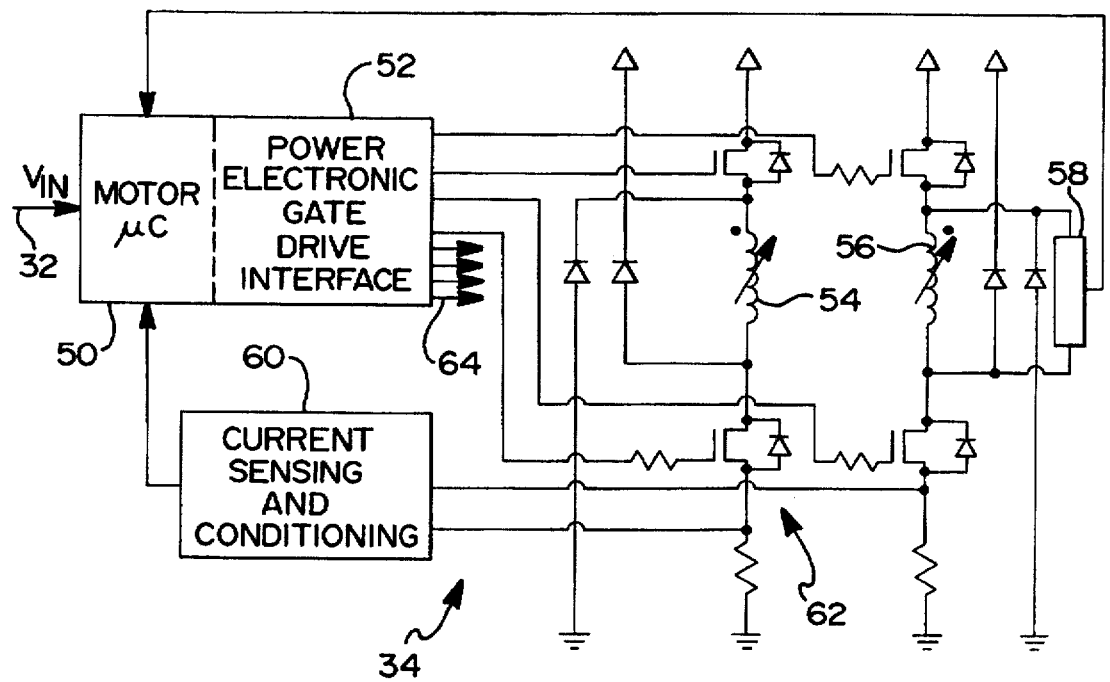
FIG. 4 is a schematic representation of a switched reluctance motor system designed in accordance with this invention.

FIG. 4 illustrates, in more detail, switched reluctance motor system 34. Microcomputer 50 is coupled to the power electronic gate drive interface 52. Gate drive interface 52 is utilized to electrically commutate the various phases of windings about the stator poles 18 in order to control the rotation of rotor 10 about rotor axis 20. FIG. 4 illustrates, schematically, main coil 54 and auxiliary coil 56. A voltage detector and analog/digital converter 58 is appropriately coupled to detect a voltage across auxiliary coil 56 when auxiliary coil 56 is energized by microcomputer 50 through the power electronic gate drive interface 52. A voltage phase signal produced by voltage detector 58 is utilized by microcomputer 50 as will be described below. Current sensing and conditioning means 60 are utilized, in part, to determine certain characteristics of the current established in the main and auxiliary coils 54 and 56, respectively. The remainder of the circuitry 62 as illustrated in FIG. 4 is conventional as used in switched reluctance type motors. The various leads 64 coming from power electronic gate drive interface 52 are used for energizing other phases (i.e., other main and auxiliary coils) on the various stator poles 16; although one phase winding is illustrated, this invention applies to switched reluctance motors with any number of phases.

The basic operation of the inventive system will now be described. Assume that the system in FIG. 3 has initial conditions of zero motor current, zero system pressure and zero motor shaft velocity. A motor control signal 32 indicates the desired change in the system pressure and, therefore, the motor shaft velocity. The motor control signal 32 is processed by microcomputer 50. Microcomputer 50 sends appropriate electronic signals to the power electronic gate drive interface circuitry 52, which commands the timing and sequence for energizing the main motor phases 54. When the main motor phases 54 are energized, the motor accelerates and the system pressure rises. The motor speed increases at a rate that ensures fast system time response to the step input signal at 26. The main phase windings 54 preferably are designed such that a high peak motor speed is possible for a low voltage system, such as a system that includes a 12 volt source.

Microcomputer 50 preferably has an indirect rotor position algorithm stored in an internal program memory. The indirect rotor position algorithm relies upon a determination of the position of rotor poles 12 relative to the stator poles 16. The auxiliary windings 56 are utilized to determine the rotor pole position relative to the stator poles. Microcomputer 50 causes a test current to be injected into the auxiliary coil 56 that corresponds to an energized main coil 54. This test current is small relative to the current that is within the main phase winding 54, which causes rotor 10 to rotate about rotor axis 20. Voltage detector and analog-to-digital convertor 58 determines a voltage across auxiliary coil 56, which results from the injected test current. The difference between a voltage phase value (as detected by 58 and processed by microcomputer 50) and a current phase value of the test current injected into auxiliary phase winding 56 is indicative of the position of the rotor pole relative to the stator pole. The use of voltmeter 58 is preferred, instead of a direct current sensor, because volt meters are more efficient and require less power. The current phase value of the test current is preferably determined through the use of current sensing and conditioning means 60.

This methodology for determining 6 rotor position is significantly better than prior attempts because the use of the auxiliary coil 56 provides an electrically isolated testing mechanism. Further, because the auxiliary winding has a large inductance (as compared to the main windings), the test current for determining rotor position is larger in amplitude than the signals used in prior attempts. The larger amplitude signal is easier to detect and is isolated from ground loop noise that is otherwise present in the wye-connected main phase windings. A nonlinear relationship between the voltage phase value and the test current phase value can be determined from emperical data and stored in memory within microcomputer 50 to be used appropriately.

Returning to the system operation, when the system pressure 40 reaches a steady state value at a rated system pressure, the motor speed decreases to zero. Under such conditions, the power electronic converter dissipates a relatively large amount of heat due to switching and conduction losses. In the preferred embodiments microcomputer 50 detects such a static holding condition. Under the static holding condition, the main winding current is ramped downward and the auxiliary winding of the same phase is ramped upward. Less current is required to maintain the same magnetic flux in the motor because the auxiliary winding has a larger number of turns compared to the main winding. In order to maintain a constant torque during the transition from the main winding to the auxiliary winding, the current must be changed at a controlled rate to account for the difference in inductance of the main and auxiliary windings. The amount of power dissipated in the motor stator windings will be the same when holding torque is applied from the main winding as with the auxiliary winding. Therefore, the motor is capable of holding a rated torque value at a reduced current level when the auxiliary winding is used in accordance with this invention.

The appropriate auxiliary winding holding current is calculated by microcomputer 50 based on the holding current of the main winding for the particular static holding condition. The relationship $i_a=(n_m/n_a)i_m$, (where $i_a$=auxiliary current, $i_m$=main current, $n_m$=number of windings 22 and $n_a$=number of windings 24) describes the relationship between the auxiliary holding current and the main winding holding current. This relationship can be emperically measured and calibrated in order to improve torque control accuracy.

The auxiliary winding continues to hold the rotor in a static condition until a new input signal 25 is received. When it becomes desirable to exit the static condition, the current in the main winding and auxiliary winding are then ramped up and down, respectively, in the reverse manner of that described above. Torque control is then returned to the main winding 54. Since electrical time constants are faster than time constants associated with mechanical brake and clutch mechanisms, the response time to a new input signal 26 is faster compared to conventional devices. Conventional devices that include mechanical brake mechanisms necessarily include a longer response time, which may be undesirable in many circumstances. Further, the use of the auxiliary windings for holding torque controls the motor static condition with a magnetic field. This method is less prone to mechanical failure such as fault in a friction contact device.

Auxiliary windings 24 are designed and wound to increase the slot fill of the stator by filling the spaces between the main phase conductors 22. Increasing the slot fill in this manner improves the thermal characteristics of the motor because the thermal impedance of copper is lower than that of air and the thermal impedance between the main and auxiliary windings to the outside of the stator is thereby reduced. The increased slot fill also tends to secure the stator windings 22 and 24 more firmly about the stator poles 16, thereby reducing the ability of the coils to vibrate during the commutation excitation. A more firm, secured connection reduces one of the primary sources of noise in a switched reluctance motor.

One skilled in the art will appreciate that the above description is exemplary rather than limited in nature. Variations and modifications to the described embodiments will become apparent that do not depart from the purview and spirit of this invention. The scope of this invention is to be limited only by the appended claims and all legal equivalents thereof.

What is claimed is:

1. A switched reluctance motor, comprising:
   a rotor that rotates about an axis and has a plurality of rotor poles;
   a stator that is stationary about said axis and generally surrounds said
   rotor, said stator including a plurality of stator poles, said rotor poles moving into and out of alignment with said stator poles when said rotor rotates about said axis;
   a main current conductive coil having a first inductance and being disposed about at least one of said stator poles;
   an auxiliary current conductive coil disposed about said at least one stator pole such that an inductance ratio of said main coil to said auxiliary coil is constant irrespective of a position of said rotor poles relative to said stator poles, said auxiliary coil having a second inductance that is greater than said first inductance;
   a selectively controllable current source for individually energizing said main coil and said auxiliary coil, respectively, to thereby produce a magnetic flux that controls whether said rotor rotates about said axis;
   a voltage sensor for determining a voltage across said auxiliary coil when said auxiliary coil is energized by said current source; and
   means for determining a difference in a current phase value associated with a current in said auxiliary coil and a voltage phase value associated with the voltage across said auxiliary coil, said difference being indicative of a position of said rotor pole relative to said stator pole.

2. The motor of claim 1, wherein said main coil has a first number of turns and wherein said auxiliary coil has a second number of turns that is greater than said first number.

3. The motor of claim 1, wherein said main coil comprises a plurality of windings having a first outer diameter and wherein said auxiliary coil comprises a plurality of windings having a second outer diameter that is smaller than said first outer diameter.

4. The motor of claim 1, wherein said main coil has a plurality of windings wound about said at least one stator pole and said auxiliary coil has a plurality of windings wound about said at least one stator pole such that said auxiliary coil windings are interspersed among said main coil windings.

5. The motor of claim 4, wherein said auxiliary windings essentially fill spaces between said main coil windings such that a thermal impedance between said main and auxiliary windings is reduced.

6. The motor of claim 4, wherein said auxiliary windings essentially fill spaces between said main coil windings and said at least one stator pole such that said coils are more firmly maintained in position about said at least one stator pole to thereby reduce noise in said motor.

7. The motor of claim 1, wherein said main coil has a plurality of windings wound about said at least one stator pole and wherein said auxiliary coil has a plurality of windings wound about said main coil windings.

8. The motor of claim 1, further comprising means for determining motor inductance characteristics and means for storing said motor inductance characteristics coupled to said current source for selectively energizing said coils according to stored motor inductance characteristics.

9. A switched reluctance motor, comprising:

a rotor that rotates about an axis and has a plurality of rotor poles;

a stator that is stationary about said axis and generally surrounds said rotor, said stator including a plurality of stator poles, said rotor poles moving into and out of alignment with said stator poles when said rotor rotates about said axis;

a main current conductive coil having a first inductance and being disposed about at least one of said stator poles;

an auxiliary current conductive coil disposed about said at least one stator pole such that an inductance ratio of said main coil to said auxiliary coil is constant irrespective of a position of said rotor poles relative to said stator poles, said auxiliary coil having a second inductance that is greater than said first inductance;

a selectively controllable current source for individually energizing said main coil and said auxiliary coil, respectively, to thereby produce a magnetic flux that controls whether said rotor rotates about said axis;

a voltage sensor for determining a voltage across said auxiliary coil when said auxiliary coil is energized by said current source; and means for determining a difference in a current phase value associated with a current in said auxiliary coil and a voltage phase value associated with the voltage across said auxiliary coil, said difference being indicative of a position of said rotor pole relative to said stator pole wherein said main coil has a plurality of windings wound about said at least one stator pole and said auxiliary coil has a plurality of windings wound about said at least one stator pole such that said auxiliary coil windings are interspersed among said main coil windings.

10. The motor of claim 9, wherein said main coil has a first number of turns and wherein said auxiliary coil has a second number of turns that is greater than said first number.

11. The motor of claim 9, wherein said main coil comprises a plurality of windings having a first outer diameter and wherein said auxiliary coil comprises a plurality of windings having a second outer diameter that is smaller than said first outer diameter.

12. The motor of claim 9, wherein said auxiliary windings essentially fill spaces between said main coil windings such that a thermal impedance between said main and auxiliary windings is reduced.

13. The motor of claim 9, wherein said auxiliary windings essentially fill spaces between said main coil windings and said at least one stator pole such that said coils are more firmly maintained in position about said at least one stator pole to thereby reduce noise in said motor.

14. The motor of claim 9, wherein said main coil has a plurality of windings wound about said at least one stator pole and wherein said auxiliary coil has a plurality of windings wound about said main coil windings.

15. The motor of claim 9, further comprising means for determining motor inductance characteristics and means for storing said motor inductance characteristics coupled to said current source for selectively energizing said coils according to stored motor inductance characteristics.

* * * * *